(12) United States Patent
Breton et al.

(10) Patent No.: US 8,158,693 B2
(45) Date of Patent: Apr. 17, 2012

(54) PROCESS FOR PREPARING STABLE PIGMENTED CURABLE SOLID INKS

(75) Inventors: Marcel P. Breton, Mississauga (CA); Michelle N. Chretien, Mississauga (CA); Barkev Keoshkerian, Thornhill (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 12/703,817

(22) Filed: Feb. 11, 2010

(65) Prior Publication Data

US 2011/0196058 A1    Aug. 11, 2011

(51) Int. Cl.
*C08F 2/50* (2006.01)
*C08J 3/28* (2006.01)
*C09D 11/10* (2006.01)
*C09D 11/02* (2006.01)

(52) U.S. Cl. ............. 522/75; 522/71; 522/74; 522/113; 522/114; 522/120; 522/121; 522/150; 522/155; 522/154; 522/178; 522/182; 106/31.13; 106/31.6

(58) Field of Classification Search ............... 106/31.13, 106/31.6; 522/71, 74, 113, 120, 121, 115, 522/178, 182, 155
See application file for complete search history.

(56) References Cited

U.S. PATENT DOCUMENTS

| | | | |
|---|---|---|---|
| 4,167,503 A * | 9/1979 | Cipriani | ......................... 524/297 |
| 6,896,937 B2 | 5/2005 | Woudenberg | |
| 7,259,275 B2 | 8/2007 | Belelie et al. | |
| 7,271,284 B2 | 9/2007 | Toma | |
| 7,276,614 B2 | 10/2007 | Toma et al. | |
| 7,279,587 B2 | 10/2007 | Odell et al. | |
| 7,322,688 B2 | 1/2008 | Woudenberg | |
| 7,559,639 B2 | 7/2009 | Belelie et al. | |
| 2006/0132570 A1 | 6/2006 | Odell et al. | |
| 2006/0158491 A1 | 7/2006 | Belelie et al. | |
| 2006/0158492 A1 | 7/2006 | Odell et al. | |
| 2006/0158496 A1 | 7/2006 | Odell et al. | |
| 2006/0159850 A1 | 7/2006 | Breton et al. | |
| 2007/0120909 A1 | 5/2007 | Belelie et al. | |
| 2007/0120910 A1 | 5/2007 | Odell et al. | |
| 2007/0120925 A1 | 5/2007 | Belelie et al. | |
| 2007/0123601 A1 | 5/2007 | Belelie et al. | |
| 2007/0123606 A1 | 5/2007 | Toma et al. | |
| 2007/0123641 A1 | 5/2007 | Belelie et al. | |
| 2007/0123642 A1 | 5/2007 | Banning et al. | |
| 2007/0123663 A1 | 5/2007 | Toma et al. | |
| 2007/0123722 A1 | 5/2007 | Toma et al. | |
| 2007/0123723 A1 | 5/2007 | Odell et al. | |
| 2007/0123724 A1 | 5/2007 | Belelie et al. | |
| 2007/0142492 A1 | 6/2007 | Odell et al. | |
| 2007/0211110 A1 | 9/2007 | Iftime et al. | |
| 2008/0000384 A1 | 1/2008 | Belelie et al. | |
| 2009/0234041 A1 | 9/2009 | Belelie et al. | |

OTHER PUBLICATIONS

U.S. Patent Application filed of even date herewith, of Marcel P. Breton et al., entitled "Curable Solid Ink Compositions" 35 pages, 3 drawing sheets, not yet published.
U.S. Appl. No. 12/642,538, filed Dec. 18, 2009, of Marcel P. Breton et al., entitled "Curable Solid Ink Compositions," 33 pages, not yet published.
"Dimer Acids," Kirk-Othmer Encyclopedia of Chemical Technology, vol. 8, 4$^{th}$ Ed. (1992), pp. 223 to 237.

* cited by examiner

*Primary Examiner* — Sanza McClendon
(74) *Attorney, Agent, or Firm* — Marylou J. Lavoie

(57) ABSTRACT

A process for preparing a radiation curable solid ink composition wherein a solid pigment and dispersant are added to a molten solid monomer including (a) heating a monomer that is solid at room temperature to a temperature above the monomer melting point to provide a molten solid monomer; (b) adding a curable component, a non-curable component, and a photoinitiator to the molten solid monomer to provide a molten ink base; (c) adding a dispersant to the molten ink base; and (d) a adding a pigment to the molten ink base with stirring to provide a curable pigmented ink composition. Included is a process for preparing a radiation curable solid ink composition wherein a liquid pigment concentrate or a solid pigment concentrate is added to an ink base.

12 Claims, 1 Drawing Sheet

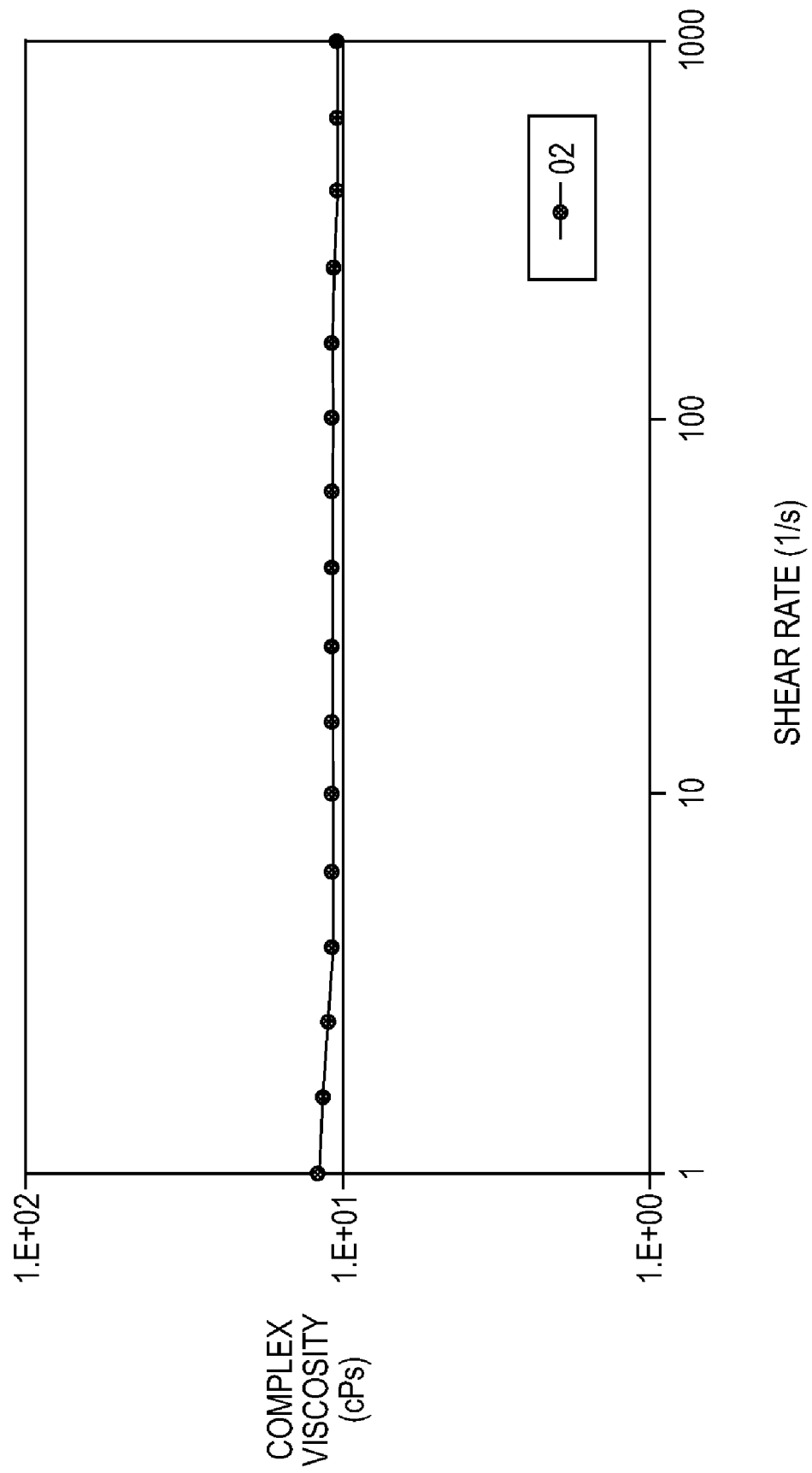

PROCESS FOR PREPARING STABLE PIGMENTED CURABLE SOLID INKS

TECHNICAL FIELD

Described herein are processes for preparing solid phase change or hot melt inks that can be used in a number of copying and printing devices. More particularly, described herein are processes for preparing stable pigmented curable solid ink concentrates and curable solid inks thereof.

RELATED APPLICATIONS

Commonly assigned U.S. patent application Ser. No. 12/704,194, entitled "Curable Solid Ink Compositions"), filed concurrently herewith, which is hereby incorporated by reference herein in its entirety, describes a curable solid ink composition containing ethoxylated octylphenol derivatives and a method for producing the same.

BACKGROUND

In general, solid inks (also referred to as phase change inks or hot melt inks) are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. A series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye, a single pigment, a mixture of dyes, a mixture of pigments, or a combination thereof.

Solid inks typically used with ink-jet printers have a wax-based ink vehicle, for example, a crystalline wax-based ink vehicle. Such solid ink-jet inks provide vivid color images. In typical systems, the crystalline-wax inks are jetted onto a transfer member, for example, an aluminum drum, at temperatures of approximately 120 to about 140° C. The wax-based inks are heated to such high temperatures to decrease their viscosity for efficient and proper jetting onto the transfer member. The transfer member is typically at a temperature of about 60° C., so that the wax will cool sufficiently to solidify or crystallize. As the transfer member rolls over the recording medium, for example paper, the image comprised of wax-based ink is pressed into the paper.

However, the use of crystalline waxes places limitations on the printing process used for conventional solid inks, particularly if the inks are used in a direct to paper application. First, the printhead must be kept at a temperature of about 120° C. which can lead to a number of problems. At these high temperatures, dyes that are molecularly dissolved in the ink vehicle are often susceptible to unwanted interactions leading to poor ink performance. For example, the dyes can be susceptible to thermal degradation, dye diffusion from the ink into the paper or other substrate, leading to poor image quality and showthrough, leaching of the dye into other solvents making contact with the image, leading to poor water/solvent-fastness. Further, for direct to paper applications it is desirable to heat the image after printing to achieve dot gain. In addition, for some substrates, the optimum spreading of the ink drops is difficult to achieve. Moreover, when the printhead is cooled and re-warmed, the resulting contraction and expansion of the ink requires a purge cycle to achieve optimum printhead performance. Particularly, the robustness (for example, smear resistance) of current inks can be insufficient for many potential applications.

Curable solid ink compositions have been proposed. Low shrinkage radiation curable solid ink compositions that can provided the advantages of handling, safety, and print quality usually associated with solid phase change inks while providing additional breakthrough performance-enabling characteristics such as compatibility with commercially available curable monomers, low jetting temperature, low shrinkage upon cooling from the melt and robustness upon curing. Curable solid ink compositions including those containing dyes and commercially resonated pigments added directly to the ink compositions have been proposed. U.S. patent application Ser. No. 12/642,538 of Marcel P. Breton, et al., filed Dec. 18, 2009, entitled "Curable Solid Ink Compositions," which is hereby incorporated by reference herein in its entirety, describes a radiation curable solid ink composition comprising at least one curable wax that is curable by free radical polymerization; at least one monomer, oligomer, or prepolymer; at least one non-curable wax; at least one free-radical photoinitiator or photoinitiating moiety; and a colorant; wherein the components form a curable ink composition that is a solid at a first temperature of from about 20 to about 25° C.; and wherein the components form a liquid composition at a second temperature of greater than about 40° C.

While currently available ink compositions are processes are suitable for their intended purposes, a need remains for processes for formulating stable pigmented curable solid inks that show improved resistance to aggregation upon aging and reduction or elimination of settling. There further remains a need for such ink systems that can offer improved lightfastness. There further remains a need for processes and ink formulations that require less energy for manufacturing and curing. In addition, a need remains for a new type of phase-change pigmented ink compositions that exhibit desirably low viscosity values at jetting temperatures, that generate images with improved look and feel characteristics, that generate images with improved hardness and toughness characteristics, and that are suitable for a number of commonly used substrates. Furthermore, it is desirable to ensure, to the extent that toxic or otherwise hazardous compounds are used in such products, that migration, evaporation or extraction of such materials from this new type of ink be controlled or ameliorated. When used in certain applications, for example food packaging, and direct to paper printing, it is desirable to reduce the amount of, or eliminate altogether, extractable species present, for example to meet environmental, health and safety requirements.

The appropriate components and process aspects of the each of the foregoing U.S. Patents and Patent Publications can be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

Currently available methods for preparing electronic devices are suitable for their intended purposes. However a need remains for an improved system and method suitable for preparing conductive structures. Further, a need remains for an improved system and method for digitally preparing conductive structures.

SUMMARY

Described is a process for preparing pigmented curable solid inks using a pigment concentrate. In one embodiment a solid pigment and dispersant are added to a molten solid monomer, the process comprising (a) heating a monomer that is solid at room temperature to a temperature above the monomer melting point to provide a molten solid monomer; (b) adding a curable component, a non-curable component, and a photoinitiator to the molten solid monomer to provide a molten ink base; (c) adding a dispersant to the molten ink base; and (d) a adding a pigment to the molten ink base with stirring to provide a curable pigmented ink composition.

In another embodiment a liquid pigment concentrate is added to an ink base, the process comprising (a) providing a monomer that is liquid at room temperature; (b) adding a curable component, a non-curable component, and a photoinitiator to the liquid monomer to provide a liquid ink base; (c) preparing a liquid pigment concentrate comprising a pigment, a liquid curable monomer, and a dispersant; and (d) combining the liquid pigment concentrate with the liquid ink base with stirring to provide a curable pigmented ink composition.

In still another embodiment, a solid pigment concentrate is added to an ink base, the process comprising (a) adding a monomer that is solid at room temperature to a dispersant in solution; (b) treating the solution of step (a) to remove liquid to provide a solid comprising monomer and dispersant; (c) adding a pigment to the solid monomer and dispersant of (b) with heating and stiffing to provide a solid pigment concentrate; and (d) combining the solid pigment concentrate with a curable solid ink base comprising a curable component, a non-curable component, and a photoinitiator with heating and stiffing to provide a curable pigmented ink composition.

BRIEF DESCRIPTION OF THE DRAWINGS

FIG. 1 is a graph illustrating complex viscosity (centipoise) versus shear rate (1/s) for an exemplary curable solid ink (Table 2) of the present disclosure.

DETAILED DESCRIPTION

Processes for formulating stable pigmented curable solid ink concentrates and inks thereof are described. Solid curable pigmented inks, in embodiments magenta pigmented inks, can be prepared. In one embodiment, a solid pigment and dispersant are added to a molten solid monomer while homogenizing at high rpm. The process of this embodiment comprises (a) heating a monomer that is solid at room temperature to a temperature above the monomer melting point to provide a molten solid monomer; (b) adding a curable component such as a curable wax, a non-curable component such as a non-curable wax, and a photoinitiator to the molten solid monomer to provide a molten ink base; (c) adding a dispersant to the molten ink base; and (d) a adding a pigment to the molten ink base with stirring to provide a curable pigmented ink composition.

In embodiments, the pigment can be added to the molten ink base while homogenizing at a high rpm (revolutions per minute). As used herein, high rpm means, for example, an rpm of from about 1,000 to about 10,000, or from about 2,000 to about 3,000, for example, using a Polytron® Homogenizer, available from Metrohm USA, Inc.

In another embodiment, a liquid pigment concentrate is formed by mixing a pigment concentrate and dispersant in a liquid curable monomer using an attrition process; and in a second step, the concentrate is added to a molten ink base while homogenizing. The process of this embodiment comprises (a) providing a monomer that is liquid at room temperature; (b) adding a curable component such as a curable wax, a non-curable component such as a non-curable wax, and a photoinitiator to the liquid monomer to provide a liquid ink base; (c) preparing a liquid pigment concentrate comprising a pigment, a liquid curable monomer, and a dispersant; and (d) combining the liquid pigment concentrate and the liquid ink base with stirring to provide a curable pigmented ink composition.

In another embodiment, a pigment concentrate in a solid curable monomer is prepared by an attrition process; the prepared pigment concentrate is added to an ink base; and the pigmented ink is melted and then mixed. The process of this embodiment comprises (a) adding a monomer that is solid at room temperature to a dispersant in solution; (b) treating the solution of step (a) to remove liquid to provide a solid comprising monomer and dispersant; (c) adding a pigment to the solid monomer and dispersant of (b) with heating and stirring to provide a solid pigment concentrate; and (d) combining the solid pigment concentrate with a curable solid ink base comprising a curable component such as a curable wax, a non-curable component such as a non-curable wax, and a photoinitiator with heating and stiffing to provide a curable pigmented ink composition.

Treating the solution to remove liquid to provide a solid comprising monomer and dispersant can comprise any suitable or desired method to removed solvent from the solution. In embodiments, treating can comprise heating, evaporating, such as rotary evaporation, or a combination thereof, for a period of time sufficient to remove solvent and provide a solid monomer dispersant mixture.

Heating can be to any suitable or desired temperature, considerate of the monomers and other components selected. In embodiments, heating is to a temperature of about 30° C. to about 150° C., or from to a temperature of about 50° C. to about 70° C. In a specific embodiment, heating can be to a temperature of about 90° C.

Homogenizing can comprise mixing at any suitable or desired speed. As discussed above, homogenizing can comprise mixing at a high rpm, with high rpm meaning for example, an rpm of from about 1,000 to about 10,000, or from about 2,000 to about 3,000. In a specific embodiment, homogenizing can be at a speed of about 10,000 rpm.

Heating and homogenizing can be for any suitable or desired time, in embodiments for about 20 to about 120 minutes, or from about 30 to about 50 minutes.

In a specific embodiment, heating is to a temperature of about 90° C., mixing is done at a speed of about 10,000 rpm for a period of about 15 minutes.

In some embodiments, the liquid pigment concentrate and solid pigment concentrate processes herein provide an average pigment particle size (Z average particle size) of less than about 120 nanometers, thereby reducing or eliminating the need for additional homogenization time in the ink making step. For example, the average pigment particle size is from about 50 to about 150 nanometers, or from about 80 to about 100 nanometers.

Further, in embodiments, the pigment concentrates are stable and do not exhibit pigment aggregation upon aging or freeze-thaw cycles. In embodiments, even after six months of standing, the pigment concentrate can be used to form inks having excellent properties. Further, in embodiments, the processes provide curable solid pigmented inks having improved lightfast properties and that can be produced at lower cost. In certain embodiments, the process for preparing a radiation curable solid ink composition wherein a liquid pigment concentrate is added to an ink base comprises (a)

providing a monomer that is liquid at room temperature; (b) adding a curable component, a non-curable component, and a photoinitiator to the liquid monomer to provide a liquid ink base; (c) preparing a liquid pigment concentrate comprising a pigment a liquid curable monomer, and a dispersant; and (d) adding the liquid pigment concentrate to the liquid ink base with stirring to provide a curable pigmented ink composition; and wherein the pigment concentrate of step (c) does not exhibit pigment aggregation even after six months standing at room temperature.

In embodiments, the curable pigmented solid inks prepared by the processes described herein comprise ink formulations that enable printing at lower temperature (such as 70° C. to 100° C.) while achieving robustness performance that exceeds conventional solid wax-based inks. These low shrinkage curable solid inks can comprise blends of waxes, ethoxylated octylphenol derivative resins, monomers, curable waxes and free-radical photoinitiators, all of them being solid with little or no odor below about 40° C. These components can also be selected to enable the production of inks that are solids or pastes at a first temperature of from about 20° C. to about 25° C.; and wherein the components form a liquid composition at a second temperature of greater than about 40° C.

In embodiments, the components are solids or pastes at a first temperature of from about 20° C. to about 25° C., and form a liquid composition at a second temperature of about 40° C. to about 100° C., wherein at least about 99%, such as about 99.5%, of the components are in liquid form and do not thermally decompose into other products when heated to the second temperature within the range of about 40° C. to about 100° C., such as about 70° C. to about 100° C. In embodiments, the components are solids or pastes at a first temperature of from about 20° C. to about 25° C., and the components form a liquid composition at a second temperature of about 70° C. to about 100° C., wherein at least 99.9%, such as about 99.99%, of the components are in liquid form do not thermally decompose into other products when heated to the second temperature within the range of about 70° C. to about 100° C., such as about 75° C. to about 95° C.

Thus, the inks of the present disclosure can be jetted at temperatures in the range of about 70° C. to about 100° C., such as from about 75° C. to about 95° C. The robustness of these inks are independently controlled by photochemically curing them with high efficiency, efficiency being dependent on the chemistry of the formulation and the reactivity of the photoinitiating system, to form images with excellent smear resistance and with a hardness after cure greater than conventional solid inks (conventional solid ink hardness=about 67). The term high efficiency curing process refers, for example, to a curing process where the photoinitiator triggers a nearly instantaneous curing reaction upon exposure to the UV light—producing a completely polymerized inks in seconds or less of exposure.

In an embodiment of the present disclosure, the curable solid ink includes curable components. The components disclosed herein can comprise any suitable curable monomer, oligomer, or prepolymer that is a solid at room temperature (about 20° C. to about 25° C.). Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include, for example, lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include, for example, isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

The monomer, oligomer, prepolymer, reactive diluent, or combination thereof, can be present in any suitable amount. In embodiments, the monomer, oligomer, prepolymer, reactive diluent, or combination thereof is present in an amount of from about 1 to about 80%, or from about 30 to about 70%, or from about 35 to about 60%, by weight based on the total weight of the curable solid ink composition.

These curable components include monomers and curable waxes, such as a dimethanol diacrylate cyclohexane difunctional monomer having a melting point of about 78° C. (sold under the trade name CD-406®, manufactured by Sartomer); an isocyanurate triacrylate trifunctional monomer having a melting point ranging from about 50° C. to about 55° C. (sold under the trade name SR-368®, manufactured by Sartomer); an acrylic ester having a mixture of 18, 20, and 22 carbons having a melting point of about 55° C. (sold under the trade name CD587®, manufactured by Sartomer); and an acrylate-modified or methacrylate-modified wax based on UNILIN® 350 (which is a hydroxyl-terminated polyethylene wax, manufactured by Baker Petrolite) having a mixture of 22, 23, and 24 carbons with a melting point ranging from about 50° C. to about 60° C. Suitable curable components can also be found in U.S. application Ser. No. 12/642,538 of Marcel P. Breton, et al., filed Dec. 18, 2009, entitled "Curable Solid Ink Compositions," which is hereby incorporated by reference herein in its entirety.

For example, the curable wax herein can be any suitable curable wax that is curable by free radical polymerization. Examples of suitable curable waxes can include those that are functionalized with curable groups. The curable groups can include, but are not limited to, acrylate, methacrylate, alkene, vinyl, and allylic ether. In embodiments, the radiation curable solid ink composition contains at least one curable wax and the at least one curable wax contains an acrylate, methacrylate, alkene, vinyl, or allylic ether functional group. These waxes can be synthesized by the reaction of a wax equipped with a transformable functional group, such as carboxylic acid or hydroxyl.

Suitable examples of hydroxyl-terminated polyethylene waxes that may be functionalized with a curable group include, for example, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

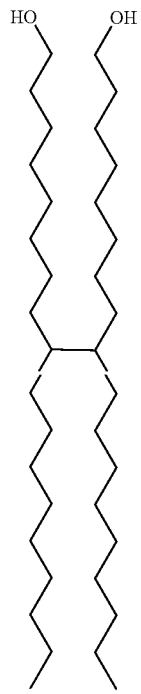

as well as other branched isomers which may include unsaturations and cyclic groups, available from Uniqema, New Castle, Del. Further information on C36 dimer diols is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, for example, mixtures of carbon chains with the structure $CH_3-(CH_2)_n-COOH$, where there is a mixture of chain lengths, n, where the average chain length is in selected embodiments in the range of about 16 to about 50, and linear low molecular weight polyethylene, of similar average chain length. Suitable examples of such waxes include, for example, UNICID® 350, UNICID® 425, UNICID® 550 and UNICID® 700 with Mn equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

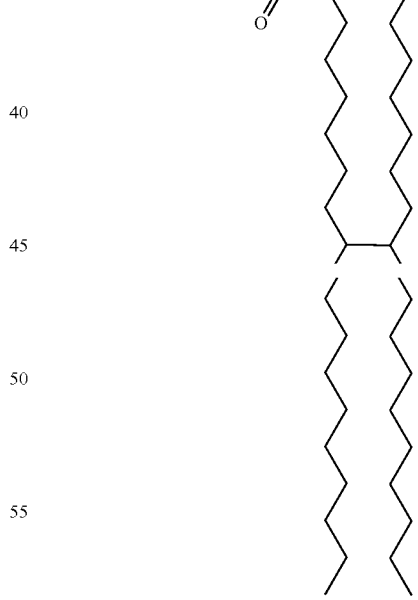

as well as other branched isomers which may include unsaturations and cyclic groups, available from Uniqema, New Castle, Del., may also be used. These carboxylic acids may be reacted with alcohols equipped with UV curable moieties to form reactive esters. Examples of these alcohols include, for example, 2-allyloxyethanol from Sigma-Aldrich Co.;

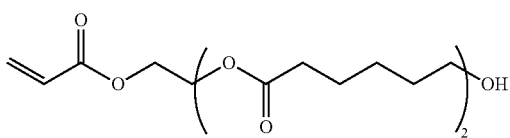

SR495B® from Sartomer Company, Inc.;

TONE® M-101 (R=H, $n_{avg}$=1), TONE® M-100 (R=H, $n_{avg}$=2) and TONE® M-201 (R=Me, $n_{avg}$=1) from The Dow Chemical Company; and

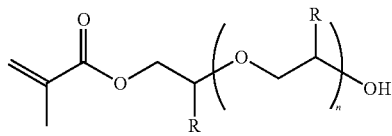

CD572® (R=H, n=10) and SR604® (R=Me, n=4) from Sartomer Company, Inc.

In embodiments, the curable wax is a curable acrylate wax having a melting point of from about 50 to about 60° C. In specific embodiments, the curable wax is Unilin® 350 acrylate. Synthesis of Unilin 350 acrylate curable wax is described in U.S. Pat. No. 7,559,639, the entire disclosure of which is totally incorporated herein by reference.

The curable wax can be present in any suitable amount. In embodiments, the curable wax can be present in an amount of from about 1 to about 25%, or from about 2 to about 20%, or from about 2.5 to about 15%, by weight based upon the total weight of the curable solid ink composition, although the amounts can be outside of these ranges.

In embodiments, the curable solid ink composition further comprises a curable oligomer. Suitable curable oligomers include, for example, acrylated polyesters, acrylated polyethers, acrylated epoxies, urethane acrylates, and pentaerythritol tetraacrylate. Specific examples of suitable acrylated oligomers include, for example, acrylated polyester oligomers, such as CN2255®, CN2256® (Sartomer Co.), and the like, acrylated urethane oligomers, acrylated epoxy oligomers, such as CN2204®, CN110® (Sartomer Co.), and the like; and mixtures and combinations thereof.

In embodiments, the radiation curable solid ink composition comprises at least one monomer, oligomer, or prepolymer having a melting point of from about 45 to about 80° C.

The curable oligomer may be present in any suitable amount, such as from about 0.1 to about 15% or from about 0.5 to about 10%, or from about 1 to about 5% by weight based upon the total weight of the curable solid ink composition.

In an embodiment of the present disclosure, the disclosed curable solid ink also includes non-curable components, present in an amount ranging from about from 5% to about 50% of the ink, such as about 20% to about 40% of the ink, or about 25% to about 40% of the ink.

The non-curable components include non-curable waxes including ethoxylated octylphenol derivatives, which are soluble in the ink composition and/or have a melting point of about 5° C. to about 10° C. below jetting temperatures (which may range from about 70° C. to about 100° C.) so that the non-curable waxes homogenously combine with the other components of the ink composition. Furthermore, the molecular weight (MW) of ethoxylated octylphenol derivatives range from about 600 to about 5000 g/mole. The term "ethoxylated octylphenol derivatives" also refers, for example, to those described in shown in co-pending application Ser. No. 12/704,194, filed of even date herewith, which is incorporated by reference herein in its entirety, and may be prepared by any desired or suitable method. In embodiments, the derivatives can be prepared as described in co-pending application Ser. No. 12/704,194.

Specific examples of ethoxylated octylphenol derivatives herein include those of the formula

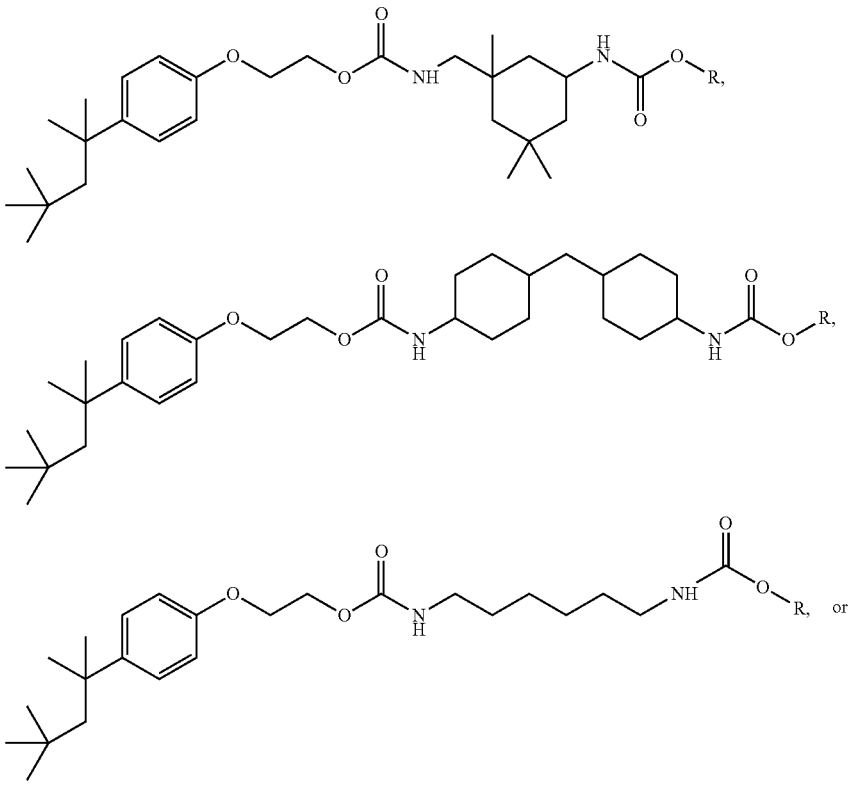

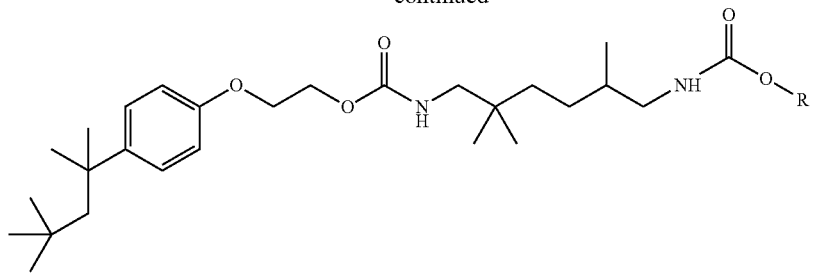

wherein R is $CH_3-(CH_2)n$ and n is an integer of from about 23 to about 33, or from about 27 to about 29.

Reactants for the ethoxylated octylphenol derivatives may be selected from the Triton® and Igepal® CA series based on octyl phenol ethoxylates, such as, for example, Igepal® CA-210 (equivalent to Triton® X-15), Igepal® CA-420 (equivalent to Triton® X-35), Igepal® CA-510 (equivalent to Triton® X-45) Igepal® CA-620 (equivalent to Triton® X-114), Igepal® CA-630 (equivalent to Triton® X-100), Igepal® CA-720 (equivalent to Triton® X-102, Igepal® CA-887 (equivalent to Triton® X-305) Igepal® CA-890 (equivalent to Triton® X-405), Igepal® CA-897 (equivalent to Triton® X705) as well as Igepal® CO series (based on nonylphenol ethoxylation) such as Igepal® CO210, CO520, CO630, CO720, CO890, and Igepal® DM970 based on dinonylphenol ethoxylates.

The ethoxylated octylphenol derivatives may be prepared by mixing specific reactive components, for example, an ethoxylated octylphenol, a linear alcohol, and a diisocyanate and/or a polyisocyanate. These reactive components may include a linear alcohol having 28 or 30 carbons (sold under the trade name Unilin® 425); ethoxylated octylphenols, such as IGEPAL® CA-210, IGEPAL® CA-420, IGEPAL® CA-520, IGEPAL® CA-620, IGEPAL® CA-630, and IGEPAL® CA-720 (ethoxylated octylphenols sold under the trade name IGEPAL®; formally manufactured by Rhone-Poulenc Co. and currently manufactured by Rhodia; the Triton® Series was formally manufactured by Union Carbide and currently manufactured by the Dow Chemical Company); diisocyanates and polyisocyanates, including aromatic, aliphatic, cycloaliphatic and/or (cyclo)aliphatic diisocyanates and/or polyisocyanates. Suitable aliphatic diisocyanates or polyisocyanates may have 3 to 16 carbon atoms or 4 to 12 carbon atoms, in the linear or branched alkyl portion, and suitable cycloaliphatic or (cyclo)aliphatic diisocyanates may possess 4 to 18 carbon atoms or 6 to 15 carbon atoms, in the cycloalkyl portion. The term "(cyclo)aliphatic diisocyanates" refers, for example, to NCO groups that are attached cyclically and aliphatically at the same time (such as isophorone diisocyanate); and cycloaliphatic diisocyanates include those which contain only NCO groups attached directly to the cycloaliphatic ring, such as $H_{12}MDI$.

Suitable diisocyanates and polyisocyanates include, for example, isophorone diisocyanate (IPDI); diisocyanatodicyclohexylmethane ($H_{12}MDI$); hexamethylene diisocyanate (HDI); 2,2,4-trimethylhexamethylene diisocyanate/2,4,4-trimethylhexamethylene diisocyanate (TM-HDI); 2-methylpentane diisocyanate (MPDI); norbornane diisocyanate (NBDI); phenylene 1,3- and 1,4-diisocyanate; naphthylene 1,5-diisocyanate; tolidine diisocyanate; tolylene 2,6-diisocyanate; tolylene 2,4-diisocyanate (2,4-TDI); diphenylmethane 2,4'-diisocyanate (2,4'-MDI); diphenylmethane 4,4'-diisocyanate; the mixtures of monomeric diphenylmethane diisocyanates (MDI) and oligomeric diphenylmethane diisocyanates (polymer MDI); xylylene diisocyanate; tetramethylxylylene diisocyanate (TMXDI); triisocyanatotoluene; cyclohexane diisocyanate; methylcyclohexane diisocyanate; ethylcyclohexane diisocyanate; propylcyclohexane diisocyanate; methyldiethylcyclohexane diisocyanate; propane diisocyanate; butane diisocyanate; pentane diisocyanate; hexane diisocyanate; heptane diisocyanate; octane diisocyanate, nonane diisocyanate; nonane triisocyanate, such as 4-isocyanatomethyloctane 1,8-diisocyanate (TIN); decane diisocyanate and triisocyanate; undecane diisocyanate and triisocyanate; dodecane diisocyanates and triisocyanates; 4-methylcyclohexane 1,3-diisocyanate; 2-butyl-2-ethylpentamethylene diisocyanate; 3 (4)-isocyanatomethyl-1-methylcyclohexyl isocyanate; 2-isocyanatopropylcyclohexyl isocyanate; methylenebis-(cyclohexyl) 2,4'-diisocyanate; 1,4-diisocyanato-4-methylpentane; and mixtures thereof.

In embodiments, the curable solid ink composition comprises a photoinitiator that initiates polymerization of curable components of the ink, including the curable monomer and the curable wax. The initiator should be solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A specific ketone is 1-[4-(2-hydroxyethoxy)-phenyl]-2-hydroxy-2-methyl-1-propane-1-one. In a specific embodiment, the ink contains an α-amino ketone, 1-[4-(2-hydroxyethoxy)-phenyl]-2-hydroxy-2-methyl-1-propane-1-one.

In a specific embodiment, the curable solid ink composition comprises a three-component photoinitiator system with no synergist. U.S. Pat. No. 6,896,937 discloses a radiation-curable hot melt ink composition comprising a colorant, a polymerizable monomer and a photoinitiating system comprising 0.5 to 1.5% by weight of an aromatic ketone photoinitiator, 2 to 10% by weight of an amine synergist, 3 to 8% by weight of a second photoinitiator that is different than the aromatic ketone photoinitiator and capable of undergoing alpha cleavage, and 0.5 to 1.5% by weight of a photosensitizer. U.S. Pat. No. 6,896,937 also discloses liquid curable ink compositions and compositions with liquid diluents, which inks are not solids at room temperature. U.S. Pat. No. 7,322,688 discloses a method of inkjet printing curable inks which inks are polymerized by a cationic photoinitiating system. In embodiments, the curable solid ink composition comprises a photoinitiator that initiates polymerization of curable components of the ink, including the curable monomer and the curable wax. In an embodiment, the initiator is solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, for example, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. An exemplary ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In a specific embodiment, the photoinitiator comprises 2-isopropylthioxanthone and 2-isopropylthioxanthone, 2-methyl-1[4-(methylthio)phenyl]-2-morpholinopropan-1-one, or a mixture or combination thereof.

In specific embodiments, the curable solid inks herein also include photoinitiators, such as α-hydroxyketone photoinitators (including α-hydroxyketone photoinitators sold under the trade name IRGACURE® 184, IRGACURE® 500, DAROCUR® 1173, and IRGACURE® 2959, which are manufactured by Ciba Special Chemicals), α-aminoketone photoinitators (including α-aminoketone photoinitators IRGACURE® 369, IRGACURE® 379, IRGACURE® 907, and IRGACURE® 1300, which are manufactured by Ciba Special Chemicals), and bisacyl phospine photoinitiators (including bisacyl phospine photoinitiators sold under the trade name IRGACURE® 819, IRGACURE® 819DW, and IRGACURE® 2022, which are manufactured by Ciba Special Chemicals). Other suitable photoinitiators include monoacylphosphine oxide and bisacylphosphine oxide, such as 2,4,6-trimethylbenzoybiphenylphosphine oxide (manufactured by BASF under the trade name Lucirin® TPO); ethyl-2,4,6-trimethylbenzoylphenyl phosphinate (manufactured by BASF under the tradename Lucirin® TPO-L); mono- and bis-acylphosphine photoinitiators (such IRGACURE® 1700, IRGACURE® 1800, IRGACURE® 1850, and DAROCUR® 4265, manufactured by Ciba Specialty Chemicals), and benzyldimethyl-ketal photoinitiators (such as IRGACURE® 651, manufactured by Ciba Specialty Chemicals).

In another embodiment of the present disclosure, the disclosed curable solid ink also includes a colorant. Any desired or effective colorant may be employed, including pigments, mixtures of pigments, mixtures of pigments and dyes, and the like, provided that the colorant may be dissolved or dispersed in the ink vehicle.

In specific embodiments, the colorant is a pigment. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The colorant is present in any desired or effective amount to obtain the desired color or hue, such as from about 0.1 to about 15%, or from about 0.2 to about 8%, by weight based upon the total weight of the curable solid ink composition.

The curable solid ink compositions can further include conventional additives to take advantage of the known functionality associated with such conventional additives. Such additives may include, for example, defoamers, slip and leveling agents, plasticizers, pigment dispersants, viscosity modifiers, antioxidants, absorbers, etc.

The ink may contain further optional additives including, but not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as Irgastab® UV 10 (Ciba Specialty Chemicals, Inc.). The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

In embodiments, the curable solid ink compositions include a dispersant. The dispersant can be any suitable or desired dispersant including, but not limited to AB-diblock copolymers of high molecular weight such as EFKA® 4340 available from Ciba Specialty Chemicals Inc., and Disperbyk® 2100 available from Byk Corp., or a mixture thereof. In a specific embodiment, the dispersant mixture comprises a cyclohexane dimethanol diacrylate (such as CD406® available from Sartomer Corporation) and at least one additional component, such as EFKA® 4340 is a high molecular weight dispersing agent having an AB-diblock copolymer structure available from Ciba Specialty Chemicals Inc. The pigment may be pre-dispersed in a compatible carrier resin to improve dispersibility.

Optional additives may be present in any suitable amount. In embodiments, the total amount of other additives may be from about 0.1 to about 15% or from about 0.5 to about 10%, by weight based upon the total weight of the curable solid ink composition.

The inks described herein may be applied to a substrate to form an image. In embodiments, the method comprises providing a curable solid ink composition described herein at a first temperature; applying, such as jetting, the radiation curable ink to the substrate in an imagewise fashion to form an image, the substrate being at a second temperature, which is below the first temperature; and exposing the radiation curable ink to radiation to cure the ink. During the curing process, the curable monomer and the curable wax, optionally with other curable components, such as the optional curable oligomer, are polymerized to form a cured image.

In a specific embodiment, the composition is applied by ink jet printing. The inks described herein are preferably jetted at temperatures of about 50° C. to about 110° C. or from about 60° C. to about 100° C. The jetting temperature must be within the range of thermal stability of the composition, to prevent premature polymerization in the print head. At jetting, the inks have a viscosity of from about 5 mPa·s to about 25 mPa·s or about 10 mPa·s to about 12 mPa·s. The inks are thus ideally suited for use in piezoelectric ink jet devices.

However, the substrate to which the inks are applied could be at a temperature at which the ink has a higher viscosity, such as a viscosity of from $10^2$ to $10^7$ mPa·s. For example, the substrate may be maintained at a temperature of about 80° C. or below, more specifically from about 0° C. to 50° C., the temperature at the substrate being less than the jetting temperature. In a specific embodiment, the substrate temperature is at least 10° C. below the first temperature or the substrate temperature is from 10 to 50° C. below the jetting temperature.

By jetting the ink at a temperature at which the ink is a liquid and having the substrate at the temperature at which the ink has a higher viscosity, a phase change can be provided. This phase change may prevent the composition from rapidly soaking into the substrate, avoiding or at least minimizing showthrough. In addition, the ink while on the substrate is exposed to radiation to initiate polymerization of the curable monomer, leading to a robust image.

In specific embodiments, the curable solid ink compositions can be employed in apparatus for direct printing ink jet processes, wherein when droplets of the melted ink are ejected in an imagewise pattern onto a recording substrate and the recording substrate is a final recording substrate, for example, direct to paper applications, although the substrate is not limited to paper. The substrate may be any suitable material such as paper, boxboard, cardboard, fabric, a transparency, plastic, glass, wood etc., although the ink is most specifically used in forming images on paper.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during four to eighteen rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing or partial fusing step, is desirable in forming the image as transfuse enables a high quality image to be built up on a rapidly rotating transfer member. Transfuse typically involves jetting the ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although it is preferably a drum or belt. The member surface may be at room temperature, although in embodiments it is preferable to heat the member such that a surface temperature thereof is maintained within a narrow temperature range so as to control the viscosity characteristics of the inks over a wide range of environmental conditions. This temperature is preferably at or below the second temperature. In this way, the ink is maintained on the surface of the transfer member until transfer to the image receiving substrate.

Following jetting to the intermediate transfer member and optional intermediate partial curing thereon, the ink is thereafter transferred to an image receiving substrate. The substrate may be any suitable material such as paper, boxboard, cardboard, fabric, a transparency, plastic, glass, wood etc., although the ink is most specifically used in forming images on paper. Following transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, more preferably from about 0.2 to about 5 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink is preferably provided by a variety of possible techniques, including but not limited to a xenon lamp, laser light, D or H bulb, light emitted diode, etc. The curing light may be filtered or focused, if desired or necessary. The curable components of the ink react to form a cured or crosslinked network of appropriate hardness. Specifically, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like preferably, in specific embodiments wherein the intermediate transfer member has good release properties. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

The present disclosure is also directed to a printer containing the inks described herein. Specifically, the present disclosure relates to a printer cartridge containing the inks described herein, as well as to a printer containing the printer cartridge.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Curable solid ink compositions were prepared by combining the components in the Tables below in the amounts listed according to the processes described herein.

CD406® is a difunctional cycloaliphatic acrylate monomer (cyclohexane dimethanol diacrylate, melting point about 78° C.) available from Sartomer Company, Inc.;

SR368® is a trifunctional monomer (tris(2-hydroxy ethyl) isocyanurate triacrylate, melting point about 50 to about 55° C.) available from Sartomer Company, Inc.;

SR9003® is a low viscosity propoxylated (2) neopentyl glycol diacrylate monomer available from Sartomer Company, Inc.;

CD587® is an acrylate ester (melting point about 55° C.) Sartomer Company, Inc.;

Unilin® 350 acrylate is a curable acrylate wax available from Baker Petrolite, (C22, C23, C24 mixture, melting point about 50 to about 60 C). Unilin 350 can be used as received or synthesized as described in U.S. Pat. No. 7,559,639, which is hereby incorporated by reference herein in its entirety;

Irgacure® 819 is a bis acyl phosphine photoinitiator comprising bis(2,4,6-trimethyl benzoyl)-phenylphosphineoxide, melting point 127 to 133° C., available from Ciba Specialty Chemicals;

Irgacure® 184 is an α-hydroxy ketone photoinitiator comprising 1-hydroxy-cyclohexyl-phenyl-ketone, melting point 45 to 49° C., available from Ciba Specialty Chemicals;

Irgacure® 907 is an α-amino-ketone photoinitiator comprising 2-methyl-1[4-(methylthio)phenyl]-2-morpholino-propan-1-one, melting point 70 to 75° C., available from Ciba Specialty Chemicals;

Unilin® 425 is a linear primary alcohol available from Baker Petrolite;

Fascat® 4202 catalyst is an organotin catalyst of the formula $C_{32}H_{64}O_4Sn$ available from Arkema Inc.;

EFKA® 4340 is a high molecular weight dispersing agent having an AB-diblock copolymer structure available from Ciba Specialty Chemicals Inc.;

Microlith® Jet Magenta 2B is a magenta pre-dispersed pigment available from Ciba Specialty Chemicals Inc.

Synthesis of Igepal® A derivative. To a 250 milliliter flask equipped with a stir magnet was charged a pre-melted mixture of 70 grams of Igepal® CA210 (OH#214.92, molecular weight (MW)=261) and 80.0 grams of Unilin® 425 (OH #95.3, MW=589). The flask was placed in a 140° C. oil bath with thermometer and heated/stirred. After about 5 minutes, 30 grams of isophorone diisocyanate (IPDI) (MW=222) was added, followed by three drops of Fascat® 4202 catalyst. An exotherm was observed. After about 1.5 hours, an (infrared) IR spectrum was obtained on the reaction product and no isocyanate peak (about 2230 cm$^{-1}$) was observed. The contents were poured into aluminum tins and allowed to cool and solidify.

In an embodiment of the process comprising (a) heating a monomer that is solid at room temperature to provide a molten solid monomer; (b) adding a curable wax, a non-curable wax, and a photoinitiator to the molten solid monomer to provide a molten ink base; (c) adding a dispersant to the molten ink base; and (d) a adding a pigment to the molten ink base with stirring to provide a curable pigmented ink composition, a pigmented curable solid ink was prepared by adding a magenta pigment (Microlith® Jet Magenta 2B, available from Ciba Specialty Chemicals Inc.) and a dispersant mix (CD406®+EFKA 4340®) available from Ciba Specialty Chemicals Inc.) to a curable solid ink base as shown in Table 1. Specifically, the solid curable ink of Table 1 was obtained by adding 7.6 grams of magenta pigment and a blend of 3.922 grams of EFKA® 4340 in 1.765 grams of CD406 to the ink base of Table 1 followed by 15 minutes of homogenization using a Polytron® at 10,000 rpm while maintaining the temperature at about 90° C. Particle size distribution of Q1 was multimodal with main peaks centered at 512 nanometers and 87 nanometers as measured with a Malvern Zeta Sizer® HT at 100° C.).

TABLE 1

Pigmented Curable Solid Ink Q1

|  | Q1a | Q1b | Q1c | SUM | Weight % |
|---|---|---|---|---|---|
| Monomer |  |  |  |  |  |
| CD406 ® | 20.615 | 20.615 | 20.615 | 61.845 | 27.697 |
| SR368 ® | 1.603 | 1.603 | 1.603 | 4.809 | 2.154 |
| CD587 ® | 12.558 | 12.558 | 12.558 | 37.674 | 16.872 |
| Curable Wax |  |  |  |  |  |
| Unilin ® 350 Acrylate-prepared as described in U.S. Pat. No. 7,559,639 | 5.950 | 5.950 | 5.950 | 17.850 | 7.994 |
| Non-curable Wax |  |  |  |  |  |
| Derivative A | 25.816 | 25.816 | 25.816 | 77.448 | 34.685 |
| Photoinitiator |  |  |  |  |  |
| Irgacure ® 819 | 1.120 | 1.120 | 1.120 | 3.360 | 1.505 |
| Irgacure ® 184 | 1.617 | 1.617 | 1.617 | 4.851 | 2.173 |
| Irgacure ® 907 | 0.721 | 0.721 | 0.721 | 2.163 | 0.969 |
| Colorant |  |  |  |  |  |
| Magenta Pigment |  |  |  | 7.600 | 3.404 |
| Resin |  |  |  | 1.064 | 0.477 |
| Pigment |  |  |  | 6.536 | 2.927 |
| Dispersant Mix |  |  |  | 5.686 | 2.547 |
| CD406 ® |  |  |  | 1.765 | 0.790 |
| Dispersant |  |  |  | 3.922 | 1.756 |
| Total | 70.00 | 70.00 | 70.00 | 223.29 | 100 |

In an embodiment of the process wherein a liquid pigment concentrate is added to an ink base, the process comprising (a) providing a monomer that is liquid at room temperature; (b) adding a curable wax, a non-curable wax, and a photoinitiator to the liquid monomer to provide a liquid ink base; (c) preparing a liquid pigment concentrate comprising a pigment and a liquid curable monomer; and (d) adding the liquid pigment concentrate to the liquid ink base with stiffing to provide a curable pigmented ink composition, a pigmented curable solid ink was prepared by adding a magenta pigment liquid concentrate (Microlith® Jet Magenta 2B) in SR9003® to a curable solid ink base as per Table 2. Specifically, the dispersant EFKA® 4340 in SR9003® (Mixture A) was obtained by mixing about 657.7 grams (about 55% in methoxypropanol) commercial EFKA® 4340 with 557.3 grams of SR9003®. This mixture was then rotary evaporated at 40° C. under vacuum (to remove the methoxpropanol) to afford a mixture comprising about 40.6% EFKA® 4340 in SR9003®.

A magenta pigment dispersion was prepared by adding 110 grams of Microlith® Magenta JET 2B to a mixture comprising 271 grams of Mixture A and 119 grams of SR9003® while homogenizing with a Polytron® set at 10,000 rpm. The mixture was homogenized for 30 minutes while maintaining a temperature of 70° C. To this was then added 233 grams of SR9003® while homogenizing and continuing to homogenize for 5 minutes to afford a magenta dispersion having a 15% solids content. This liquid dispersion was then used to prepare the ink Q2 of Table 2.

The particle size was obtained as per Q1 ink. The Z-average particle size of Q2 measured under these conditions is 85 nanometers with no change in particle size due to freeze-thaw. The complex viscosity of Q2 is about 11 centipoise at 90° C. as measured on a TA Instruments® RFS-3 (Rheometrics Fluid Spectrometer) strain-controlled rheometer. As shown in FIG. 1, the viscosity for ink Q2 was independent of shear rate. The ink meets all jetting requirements of for Xerox® piezoelectric printers.

TABLE 2

Pigmented Curable Solid Ink Q2

| | Q2a | Q2b | Q2c | SUM | Weight % |
|---|---|---|---|---|---|
| Monomer | | | | | |
| CD406® | 20.615 | 20.615 | 20.615 | 61.845 | 23.787 |
| SR368® | 1.603 | 1.603 | 1.603 | 4.809 | 1.850 |
| CD587® | 12.558 | 12.558 | 12.558 | 37.674 | 14.490 |
| Curable Wax | | | | | |
| Unilin® 350 Acrylate-prepared as described in U.S. Pat. No. 7,559,639 | 5.950 | 5.950 | 5.950 | 17.850 | 6.865 |
| Non-curable Wax | | | | | |
| Derivative A | 25.816 | 25.816 | 25.816 | 77.448 | 29.788 |
| Photoinitiator | | | | | |
| Irgacure® 819 | 1.120 | 1.120 | 1.120 | 3.360 | 1.292 |
| Irgacure® 184 | 1.617 | 1.617 | 1.617 | 4.851 | 1.866 |
| Irgacure® 907 | 0.721 | 0.721 | 0.721 | 2.163 | 0.832 |
| Colorant | | | | | |
| Magenta Pigment Concentrate (15%) | | | | 50.000 | 19.231 |
| SR9003® | | | | 35.000 | 13.462 |
| Dispersant | | | | 7.500 | 2.885 |
| Magenta Pigment | | | | 7.500 | 2.885 |
| Total | 70.00 | 70.00 | 70.00 | 260.00 | 100 |

In embodiments of the process wherein a solid pigment concentrate is added to an ink base, the process comprising (a) adding a monomer that is solid at room temperature to a dispersant in solution; (b) treating the solution of step (a) to remove liquid to provide a solid comprising monomer and dispersant; (c) adding a pigment to the solid monomer and dispersant of (b) with heating and stirring to provide a solid pigment concentrate; and (d) adding the solid pigment concentrate to a curable solid ink base comprising a curable wax, a non-curable wax, and a photoinitiator with heating and stiffing to provide a curable pigmented ink composition, a pigmented curable solid ink was prepared by adding a solid magenta pigment concentrate (Microlith® Jet Magenta 2B) in CD406® as per Table 3 to a curable solid ink base as per Tables 4 and 5. Specifically, a solid curable pigment concentrate was obtained by first adding 123.4 grams of CD406® to 92.3 grams of a solution of EFKA® 4340 (about 56% solids content in methoxypropanol) to provide Mixture B. Mixture B was heated and rotary evaporated to remove methoxypropanol to provide 178.9 grams of a mixture of EFKA® 4340 in CD406® (31% EFKA® 4340). This mixture was then used to prepare a magenta concentrate in CD406® by combining 178.9 grams of Mixture B, 158 grams of CD406®, and 86.5 grams of Microlith® Magenta JET 2B and homogenizing using a Polytron® at a temperature of 90° C. for 15 minutes at 10,000 rpm to provide a 21% pigment dispersion.

The particle size was obtained as per Q1 ink. The Z-average particle size of Q7 measured under these conditions is 111 nanometers with no change in particle size due to freeze-thaw. The ink meets the jetting requirements of Xerox® piezoelectric printers.

TABLE 3

Magenta Pigment Concentrate Composition

| CD406® | 66.4% |
|---|---|
| Dispersant | 12.6% |
| Magenta Pigment | 21% |

TABLE 4

Pigmented Curable Solid Ink Q3

| | Q3a | Q3b | Q3c | SUM | Weight % |
|---|---|---|---|---|---|
| Monomer | | | | | |
| CD406® | 8.948 | 8.948 | 8.948 | 26.844 | 11.93 |
| SR368® | 1.603 | 1.603 | 1.603 | 4.09 | 2.14 |
| CD587® | 12.558 | 12.558 | 12.558 | 37.674 | 16.74 |
| Curable Wax | | | | | |
| Unilin® 350 Acrylate-prepared as described in U.S. Pat. No. 7,559,639 | 5.950 | 5.950 | 5.950 | 17.850 | 7.93 |
| Non-curable Wax | | | | | |
| Derivative A | 25.816 | 25.816 | 25.816 | 77.448 | 34.42 |
| Photoinitiator | | | | | |
| Irgacure® 819 | 1.120 | 1.120 | 1.120 | 3.360 | 1.49 |
| Irgacure® 184 | 1.617 | 1.617 | 1.617 | 4.851 | 2.16 |
| Irgacure® 907 | 0.721 | 0.721 | 0.721 | 2.163 | 0.96 |
| Colorant | | | | | |
| Magenta Pigment Concentrate (21%) | | | | 50.000 | 22.22 |
| CD406® (66.4%) | | | | 33.200 | 14.76 |
| Dispersant (12.6%0) | | | | 6.300 | 2.80 |
| Magenta Pigment (21%) | | | | 10.500 | 4.67 |
| Total | 58.33 | 58.33 | 58.33 | 225.00 | 100 |

TABLE 5

Pigmented Curable Solid Ink Q7

| | Q7a |
|---|---|
| Monomer | |
| CD406® | 2.008 |
| SR368® | 0.236 |
| CD587® | 1.849 |
| Curable Wax | |
| Unilin® 350 Acrylate-prepared as described in | 0.876 |

TABLE 5-continued

Pigmented Curable Solid Ink Q7

|  | Q7a |
|---|---|
| U.S. Pat. No. 7,559,639 Non-curable Wax | |
| Derivative A Photoinitiator | 2.976 |
| Irgacure ® 819 | 0.165 |
| Irgacure ® 184 | 0.238 |
| Irgacure ® 907 | 0.106 |
| Colorant | |
| Magenta Pigment Concentrate | 1.547 |
| CD406 ® (66.4%) | 1.027 |
| Dispersant (12.6%0 | 0.195 |
| Magenta Pigment (21%) | 0.325 |
| Total | 10.00 |

In embodiments, processes for preparing pigmented curable solid inks herein retain the advantages of handling, safety, and print quality usually associated with solid, phase change processes and inks and curable solid inks formulated using dyes as colorants while further providing additional breakthrough performance enabling characteristics such as ease of manufacturing and improve cure speed when liquid curable concentrates are used, low shrinkage upon cooling to room temperature, direct to paper printing, superior hardness upon curing as compared to solid inks, no smear and increased stability including resistance to aggregation and shelf life, and excellent scratch resistance. In one embodiment for preparing the present pigmented curable solid inks of this invention, a pigment concentrate is prepared from a liquid monomer at room temperature, and in another embodiment, the pigment concentrate is prepared from a solid monomer heated above its melting point. In some embodiments, the inks obtained using the present processes provide an average particle size of less than about 120 nanometers which provides long term stability with little to no gravitational settling, do not require additional homogenization time during the ink making step. The pigment concentrates used to prepare the inks are stable; that is, they show no pigment aggregation upon aging for the concentrate prepared from a liquid monomer and no pigment aggregation upon freeze-thaw for the concentrate prepared from a solid monomer. Because the same dispersant is used for both concentrates, the present processes provide the ink formulator an additional degree of freedom where liquid, solid, or mixtures of both pigment concentrates can be used to prepare curable inks that have controlled solid state properties at room temperature up to their melting point.

It will be appreciated that various of the above-disclosed and other features and functions, or alternatives thereof, can be desirably combined into many other different systems or applications. Also that various presently unforeseen or unanticipated alternatives, modifications, variations or improvements therein can be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process for preparing a radiation curable solid ink composition wherein a liquid pigment concentrate is added to an ink base, the process comprising:
   (a) providing a monomer that is liquid at room temperature;
   (b) adding a curable component, a non-curable component, and a photoinitiator to the liquid monomer to provide a liquid ink base, wherein the non-curable component comprises at least one ethoxylated octylphenol derivative;
   (c) preparing a liquid pigment concentrate comprising a pigment, a liquid curable monomer, and a dispersant; and
   (d) combining the liquid pigment concentrate and the liquid ink base with stirring to provide a curable pigmented ink composition;
   wherein the liquid pigment concentrate has a Z average pigment particle size of less than about 120 nanometers.

2. The process of claim 1, wherein combining the liquid pigment concentrate and the liquid ink base with stifling comprises homogenizing at high rpm of from about 1,000 to about 10,000 revolutions per minute.

3. The process of claim 1, wherein the pigment concentrate of step (c) does not exhibit pigment aggregation even after six months standing at room temperature.

4. The process of claim 1, wherein the monomer that is liquid at room temperature is a propoxylated neopentyl glycol diacrylate.

5. The process of claim 1, wherein the curable component comprises at least one curable wax.

6. A process for preparing a radiation curable solid ink composition wherein a solid pigment concentrate is added to an ink base, the process comprising:
   (a) adding a monomer that is solid at room temperature to a dispersant in solution;
   (b) treating the solution of step (a) to remove liquid to provide a solid comprising monomer and dispersant;
   (c) adding a pigment to the solid monomer and dispersant of (b) with heating and stifling to provide a solid pigment concentrate; and
   (d) combining the solid pigment concentrate and a curable solid ink base comprising a curable component, a non-curable component, and a photoinitiator with heating and stifling to provide a curable pigmented ink composition.

7. The process of claim 6, wherein the liquid pigment concentrate has a Z average pigment particle size of less than about 120 nanometers.

8. The process of claim 6, wherein the pigment concentrate of step (c) does not exhibit pigment aggregation even after six months standing at room temperature.

9. The process of claim 6, wherein the monomer that is solid at room temperature comprises an acrylate monomer, a methacrylate monomer, a multifunctional acrylate monomer, a multifunctional methacrylate monomer, or a mixture or combination thereof.

10. The process of claim 6, wherein the curable component comprises at least one curable wax.

11. The process of claim 6, wherein the non-curable component comprises at least one ethoxylated octylphenol derivative.

12. The process of claim 6, wherein stifling comprises homogenizing at high rpm of from about 1,000 to about 10,000 revolutions per minute.

* * * * *